United States Patent [19]

Login

[11] 4,156,073

[45] May 22, 1979

[54] BRANCHED WATER-DISPERSIBLE POLYESTER

[75] Inventor: Robert B. Login, Woodhaven, Mich.

[73] Assignee: BASF Wyandotte Corporation, Wyandotte, Mich.

[21] Appl. No.: 892,186

[22] Filed: Mar. 31, 1978

Related U.S. Application Data

[63] Continuation of Ser. No. 702,043, Jul. 2, 1976, abandoned.

[51] Int. Cl.$^2$ .................. C08G 63/12; C08G 63/68
[52] U.S. Cl. ........................... 528/295; 260/29.2 E; 260/29.6 E; 260/29.6 H; 260/29.6 TA; 428/395
[58] Field of Search .................. 260/75 S; 528/295

[56] References Cited

U.S. PATENT DOCUMENTS

| | | | |
|---|---|---|---|
| 3,223,752 | 12/1965 | Tate et al. .................. | 260/873 |
| 3,310,512 | 3/1967 | Curtice .................. | 260/29.4 |
| 3,427,267 | 11/1969 | Stieger et al. .................. | 260/873 |
| 3,563,942 | 2/1971 | Heiberger .................. | 260/29.2 |
| 3,634,541 | 1/1972 | Popp et al. .................. | 260/75 S |
| 3,725,348 | 4/1973 | Harrison et al. .................. | 528/295 |
| 3,725,351 | 4/1973 | Harrison .................. | 260/75 S |
| 3,779,993 | 12/1973 | Kibler et al. .................. | 260/75 S |
| 3,853,820 | 10/1974 | Vachon .................. | 260/75 S |
| 4,011,185 | 3/1977 | Hosokawa et al. .................. | 260/29.2 N |
| 4,104,269 | 8/1978 | Schade .................. | 528/295 |

OTHER PUBLICATIONS

Chem. Absts., vol. 84:166173t, "Polyesters Easily Soluble or Dispersible in Water", Hintermeier et al.
Chem. Absts., vol. 74:126,517, "Aqueous Dispersion of Co-Polyesters Modified with a Sulfonated Aromatic Compound, " Heiberger.
Chem. Absts., 72.112931x, Branched Polyesters—, Caldwell.
Chem. Absts., 73:88705z, Manufacturing Stabilized Branched Polyesters, Shima et al.
Chem. Absts., 77:35531r, Polyester Resins—Fibers, Harrier.
Chem. Absts., 85:22291c, Branched Polyesters, Komoto et al.

*Primary Examiner*—Edward M. Woodberry
*Attorney, Agent, or Firm*—Andrew E. Pierce; Bernhard R. Swick; Robert E. Dunn

[57] ABSTRACT

A polyester size composition for synthetic fibers useful in protecting the fibers from abrasion during the weaving process or to improve the adhesion to the fibers of conventional size compositions and especially useful with polyester fibers such as those based upon polyethylene terephthalate, comprises a branched water-dispersible polyester which is the reaction product of at least one polycarboxylic acid, at least one diol or polyglycol and an aromatic carboxylic acid containing a —SO$_3$M grouping which is attached to the aromatic nucleus of said carboxylic acid through an aliphatic chain and ester linkage and wherein said linkage contains about 2 to about 8 carbon atoms.

8 Claims, No Drawings

BRANCHED WATER-DISPERSIBLE POLYESTER

This is a continuation of application Ser. No. 702,043, filed July 2, 1976 now abandoned.

BACKGROUND OF THE INVENTION

1. Field of the Invention

This invention relates to a novel polyester composition and to sizing compositions utilizing said novel polyester composition on a fibrous article such as a synthetic textile yarn.

2. Description of the Prior Art

Prior to the weaving operation a continuous filament polyester warp yarn is usually given a twist of about 10 to 15 turns per yard and treated with a sizing composition which binds the filaments of the yarn together so as to strengthen the yarn by rendering it more resistant to abrasive forces to which it is exposed during the subsequent weaving operation. It is less expensive to size the warp yarn than to impart a high degree of twist to the yarn in order to reduce the breaking tendency during weaving. Sizing materials, besides conferring abrasion resistance, must have the additional property of being easily removed subsequent to the weaving operation so as to return the yarn to its unsized state in which chemical dyeing treatments are often performed on the woven fabric.

It is common in the textile industry to use as sizing materials easily removed high molecular weight polymers such as polyvinyl alcohol and starch but with the advent of synthetic fibers, especially polyester fibers based upon polyethylene terephthalate, yarns made of these materials are not suitably sized with these conventional sizing materials but require a synthetic sizing material having suitable adhesion to the synthetic fiber as exemplified by those taught in U.S. Pat. No. 3,546,008. Such synthetic sizes have been found difficult to remove by ordinary washing in the presence of caustic soda.

In U.S. Pat. No. 3,546,008 there is disclosed a copolyester containing the residue of a 5-sodio-sulfo-isophthalic acid. This polyester is disclosed as useful as a sizing composition on a textile yarn such as a yarn made from poly(ethylene terephthalate). Such sizing compositions have found acceptance especially for the sizing of textile yarns with which difficulties have been experienced in adhering conventional sizing materials thereto. For instance, the use of the less adhesive starch and polyvinyl alcohol based sizes is found to be relatively ineffective as compared to the polyester size compositions disclosed in said U.S. patent. The size compositions of said patent are those prepared using at least one difunctional dicarboxylic acid sulfomonomer containing a —$SO_3M$ group attached to an aromatic nucleus wherein M is hydrogen or a metal as disclosed in said patent. These size compositions have exhibited the defect of marginal solubility in the usual caustic solutions such that they are difficult to remove from the fibers.

U.S. Pat. No. 3,779,993 relates to water-dispersible polyesters and polyester amides prepared by reacting a glycol, a dicarboxylic acid, and at least one difunctional comonomer which contains a metallic salt of a sulfonic acid radical which is attached to an aromatic nucleus. However, in column 11, Table 1, it is disclosed that polymer Y can be prepared using a formula illustrated in footnote 11 in which the sulfonate group is attached by an aliphatic chain to a succinic acid ester. Such polyesters can be used as sizing or coating compositions when dispersed in water.

British Pat. No. 1,418,975 is similar to the above in having disclosed therein the preparation of water-soluble sulfonated polyester size compositions comprising (1) polyesters having unsaturated aliphatic bonds which are sulfonated subsequent to polyester formation or (2) polyesters prepared from a sulfonated diester of an unsaturated aliphatic diacid.

The —$SO_3M$ group where M is a metal has also been incorporated in polyesters suitable for forming fibers according to U.S. Pat. No. 3,018,272 where the group functions as a basic dye sensitizing unit to permit the fibers to be readily dyed using basic dyes. The basic dye sensitizing unit is substituted on either an alkylene radical or an arylene radical. The polyesters disclosed are apparently not water-dispersible.

U.S. Pat. No. 3,147,301 relates to a method of imparting ionic properties to copolymers by reaction of a suitable ethylenically unsaturated vicinal dicarboxylic acid, its anhydride or acyl halide with an hydroxysulfonic acid. Modification of polymers is taught so as to provide slightly ionic or hydrophilic properties in, for instance, an hydrophobic polymer. Such modification also provides improved dyeability and improved antistatic properties in the polymer but there is no disclosure of the preparation of polyesters or water-soluble polyesters.

U.S. Pat. No. 3,033,824 relates to polyester fibers having improved dyeability prepared by the incorporation therein of a mono- or difunctional aromatic compound possessing a sulfonic acid group or its salts, esters or amides. As indicated in column 3, two sulfonate or sulfonamide groups can be attached to the aromatic ring, one directly and one indirectly through a carbonyl group, or a single sulfonate or sulfonamide group can be directly attached to the aromatic ring. Such polyesters are not disclosed as water-soluble.

The polymers of the prior art can be distinguished structurally from those of the present invention and also on the basis that certain polymers of the prior art are hydrophobic and, therefore, would lack the water solubility required for use as a sizing material. The water-dispersible polyester sizes of the prior art contain sulfonate groups attached to the backbone of the polyester by direct substitution on an arylene or an alkylene group of the polymer backbone and, therefore, would differ structurally from those polyesters disclosed herein in which the sulfonate group is attached to an aromatic nucleus through an aliphatic or cycloaliphatic hydrocarbon chain and ester linkage.

SUMMARY OF THE INVENTION

It has now been discovered that a novel sizing material for synthetic textile yarn, particularly polyester derived textile yarn, results when the polyester sizing material includes a carboxylic acid reactant which contains a sulfonate group in the form of the metallic salt of sulfonic acid, said sulfonate group being attached by way of an aliphatic chain and an ester linkage to said carboxylic acid. Said polyester is the reaction product of at least one dicarboxylic acid or anhydride or acid ester, at least one diol or polyglycol and said sulfonate group containing carboxylic acid reactant. Throughout this specification and claims the term "carboxylic acid" is used with the understanding that the corresponding acid anhydride, acid ester or acyl halide where halogen is, for example, chlorine can be substituted therefor.

The novel structure of the polyester of the invention permits the production of a polyester sizing material having improved dispersibility and, in addition, the metal sulfonate group containing monomer used offers economies over the sulfonate group containing monomers of the prior art such that beneficial effects obtained by use of a relatively large amount of said monomer can be obtained in the polyester size composition without substantially increasing the cost. Such size compositions are useful either alone, in admixture with or in successive applications of conventional size compositions comprising starch, polyvinyl alcohol and polyacrylic acid.

DESCRIPTION OF THE PREFERRED EMBODIMENTS

In preparing the novel polyester size compositions of the invention, the necessary reactants can be added to a single reaction vessel equipped with condensing equipment to remove the water evolved during the formation of the polyester. The conditions of heating are generally at a temperature of from about 150° C. to 200° C. over a time of about 1 hour to about 8 hours. In a preferred preparation of the polyester size of the invention an aromatic or aliphatic polycarboxylic acid or mixture thereof is added to the vessel, followed by the addition of less than a stoichiometric amount of a metallic salt of an hydroxysulfonic acid in combination with an aromatic anhydride such as phthalic or trimellitic anhydride. Upon heating for a period of about 15 to 60 minutes, preferably at a temperature of about 160° C. to about 170° C., the metallic salt of the hydroxysulfonic acid has preferentially and substantially reacted with the acid anhydride. Subsequently, the polyglycol component such as diethylene glycol is added to the reactor and the temperature slowly raised to 200° C. over a period of about 30 to 180 minutes to effect esterification of the mixture. The reaction is conducted under a nitrogen atmosphere or with a nitrogen sparge as is conventional in the preparation of polyesters. Upon the mixture reaching the desired acid number of about 10 to about 50, the mixture has changed in appearance from a fluid transparent liquid to one that is heavier bodied and slightly hazy. Subsequently, the polyester is poured out of the reactor and allowed to cool to a tough flexible plastic material, the polyester size composition of the invention.

The polyester size compositions of the invention generally contain, based upon the sum of the theoretical mole percentages of the other acid components of said polyester, about 5 to about 50 mole percent of at least one carboxylic acid monomer containing the —SO$_3$M group or mixtures thereof; about 95 to about 50 mole percent of at least one aromatic or aliphatic dicarboxylic acid or mixtures thereof and about 100 mole percent of at least one diol or polyglycol or mixtures thereof. The ease of dispersibility of the polyester size of the invention is directly related to the amount of the carboxylic acid or ester derivative of a monomer or monomers containing the —SO$_3$M group. It is also possible to increase the dispersibility of such polyester size composition by changing the type of diol or polyglycol. This generally leads to the production of a polyester size composition having poor strength and excessive tack under high humidity conditions, i.e., 65% relative humidity and, therefore, insufficient abrasion resistance as compared to polyester size compositions containing substantially less diol or polyglycol as a component of the polyester.

As described above, the preparation of the carboxylic acid or ester monomer of the invention which is used to impart dispersibility to the polyester of the invention involves the attachment to a carboxylic acid, anhydride or ester derivative thereof of a metallic sulfonate group through an aliphatic chain and ester linkage. This can be accomplished as described above by the in-situ esterification prior to polyesterification of an aromatic dicarboxylic acid, anhydride, acyl halide or ester derivative thereof with an hydroxysulfonic acid metallic salt. Suitable hydroxysulfonic metal salts can be prepared from the appropriate acids as described hereinafter and correspond to the general formula:

$$HO-Q-SO_3M$$

wherein Q is a bivalent aliphatic or cycloaliphatic saturated or unsaturated hydrocarbon radical having about 2 to about 8 carbon atoms and its valence bonds on different carbon atoms and which can contain halogen substitutents and in which M is an alkali metal. Representative examples of hydroxy aliphatic and cycloaliphatic hydrocarbon sulfonic acids are as follows:
2-hydroxyethanesulfonic acid (isethionic acid),
2-hydroxy-1-propanesulfonic acid,
1-hydroxy-2-propanesulfonic acid,
3-hydroxy-1-propanesulfonic acid,
2-hydroxy-1-butanesulfonic acid,
1-hydroxy-2-butanesulfonic acid,
3-hydroxy-2-butanesulfonic acid,
1-hydroxy-2-methyl-2-propanesulfonic acid,
2-hydroxy-2-methyl-1-propanesulfonic acid,
3-bromo-1-hydroxy-2-propanesulfonic acid,
3-bromo-2-hydroxy-1-propanesulfonic acid,
3-chloro-1-hydroxy-2-propanesulfonic acid,
3-chloro-2-hydroxy-1-propanesulfonic acid,
1-bromo-2-hydroxy-3-butanesulfonic acid,
1-bromo-3-hydroxy-2-butanesulfonic acid,
1-chloro-2-hydroxy-3-butanesulfonic acid,
1-chloro-3-hydroxy-2-butanesulfonic acid,
3-bromo-1-hydroxy-2-butanesulfonic acid,
3-bromo-2-hydroxy-1-butanesulfonic acid,
3-chloro-1-hydroxy-2-butanesulfonic acid,
3-chloro-2-hydroxy-1-butanesulfonic acid,
3-chloro-2-hydroxy-2-methyl-1-propanesulfonic acid,
1-chloro-3-hydroxy-2-methyl-2-propanesulfonic acid,
3-chloro-2-(chloromethyl)-2-hydroxy-1-propanesulfonic acid,
1-chloro-2-(chloromethyl)-3-hydroxy-2-propanesulfonic acid,
1-hydroxy-3-methoxy-2-propanesulfonic acid,
2-hydroxy-3-methoxy-1-propanesulfonic acid,
1-hydroxy-2-octanesulfonic acid,
1-hydroxy-2-dodecanesulfonic acid,
1-hydroxy-2-hexadecanesulfonic acid and
2-hydroxycyclohexanesulfonic acid.
Useful metals are sodium, lithium, and potassium.

The hydroxysulfonic acids of the invention are preferably reacted with a polyfunctional aromatic carboxylic acid anhydride or mixtures thereof. A proportion of the hydroxysulfonic acid is preferably utilized in the reaction so as to leave the sulfonate group containing polyfunctional compound at least difunctional in order that the reaction product can be utilized as a monomer ester reactant in the preparation of a polyester which will function as a chain extender rather than a chain terminator as would be the case when the reaction product is monofunctional. However, sulfonate group containing monofunctional monomers can be used where the amount of other trifunctional components is increased to compensate for the chain termination effect of such monomer. To illustrate, the reaction product of 0.23 mole of the sodium salt of isethionic acid (2-hydroxyethane sulfonic acid) with 0.23 mole trimellitic anhydride is a difunctional monomer reaction product which is suitable for further reaction with a diol or polyglycol to form the polyester size compositions of the invention. Preferably, the mono- or difunctional reaction product is used in combination with other dicarboxylic acids which can be aromatic or aliphatic in order to obtain a suitable balance of physical properties in the size composition prepared by polyesterification of these ingredients; however, even though the hydroxysulfonic acid salt can form esters with all carboxylic acid containing molecules present, the net result on polymerization is a high molecular weight polyester.

The hydroxysulfonic acids can be used in the form of their metallic salts such as the sodium and potassium salt. These salts are readily prepared by neutralization of the sulfonic acid with an equivalent amount of an alkali metal hydroxide or carbonate.

In addition to the polycarboxylic acid component which is at least difunctional and to which the metallic sulfonate group is attached through an aliphatic chain and ester linkage, the polyester size composition of the invention is prepared from other polycarboxylic acid components which can be any aliphatic, cycloaliphatic or aromatic polycarboxylic acid or mixtures thereof. Examples of such acids are phthalic, terephthalic, isophthalic, trimellitic, pyromellitic, oxalic, malonic, succinic, glutaric, adipic, pimelic, suberic, azelaic, sebacic, maleic, fumaric, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diglycolic, thiodipropionic, and 2,5-naphthalene dicarboxylic acids. Suitable mixtures of these polycarboxylic acids can be utilized to obtain optimal physical properties in the polyester size composition of the invention as is well known by those skilled in the art. The corresponding acid anhydrides, esters and acyl halides of the above enumerated polycarboxylic acids can also be used in preparing the novel polyester size compositions of the invention.

Generally, about 5 to about 50 mole percent based upon the sum of the mole percentages of the acid components of said polyester of the aromatic polycarboxylic acid having a metallic salt of a sulfonic acid group attached thereto through an aliphatic chain and ester linkage is required in the polyester size composition of the invention. Preferably about 15 to about 40 mole percent is desirable and most preferably about 20 to about 30 mole percent is desirable.

The diol or polyglycol used in preparing the novel polyester size compositions of the invention can be a poly(ethylene glycol) having the generalized formula:

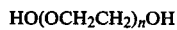

HO(OCH$_2$CH$_2$)$_n$OH or a poly(methylene glycol) having the generalized formula:

HO(CH$_2$)$_n$OH wherein in each formula n is an integer of from 2 to about 10.

Examples of useful polyglycols include diethylene glycol, triethylene glycol, tetraethylene glycol, pentaethylene, hexaethylene, heptaethylene, octaethylene, nonaethylene, and decaethylene glycols, and mixtures thereof. The diol component can consist of aliphatic, alicyclic, and aralkyl glycols.

Examples of useful diols (glycols) include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers can be prepared from two or more of the above glycols.

The diol or polyglycol can also include a minor amount of a polyol which is essentially free from ethylenic unsaturation. Thus up to 20 mole percent of a polyol can be used to replace a portion of the diol component. The term "polyol" as used herein refers to an organic compound having more than two (2) hydroxyl groups per molecule as determined by the average of the hydroxyl groups per molecule. Representative polyols essentially free from ethylenic unsaturation are well known in the art. They are often prepared by the catalytic condensation of an alkylene oxide or mixture of alkylene oxides either simultaneously or sequentially with an organic compound having at least two active hydrogen atoms. Representative polyols include the polyhydroxy-containing polyesters, polyalkylene polyether polyols, alkylene oxide and adducts of polyhydric polythiol ethers.

It is believed that the novel structure of the aromatic monomer which imparts dispersibility to the polyester of the invention, said monomer containing a —SO$_3$M group attached to an aromatic nucleus through an aliphatic chain and ester linkage, permits greater effectiveness, in comparison with prior art sizes, of the sulfonate group in effecting dispersion of the polyester.

The novel polyester size compositions of the invention can be produced in powder or pellet form for addition to water at a convenient temperature such as between about room temperature to about 100° C. whereupon the size composition is dispersed by the use of moderate agitation. The size compositions of the invention are usually made up to a concentration in water of about 15 to about 40 percent and at this concentration the size forms a dispersion in water which is stable indefinitely.

Many types of synthetic fibers can be sized using the size compositions of the invention. Synthetic polyesters prepared from linear polyesters as exemplified by polyethylene terephthalate based polyesters can be effectively sized together with other synthetic fibers such as cellulosics as exemplified by cellulose acetate. The preparation of such polyesters and other polymeric fibers is well known in the art. Additives, such as whiteners, dyes, and stabilizers can be incorporated into the sizing compositions of the invention as required.

The following examples will further illustrate the nature and the method of preparation of the polyester size compositions of the invention. These examples, however, are not to be considered as limiting the invention. In the specification, claims and the examples which follow, all proportions are by weight and all temperatures are in degrees centigrade unless otherwise noted.

EXAMPLE 1

A polyester useful in a textile fiber size composition of the invention was prepared as follows:

Into a 500-millimeter flask equipped with a heavy-duty constant torque stirring device, thermometer and thermometer well, sparge tube and vacuum distillation take-off, said flask being heated by use of an oil bath, there was added 104 grams of isophthalic acid, 28 grams of azelaic acid, 34 grams of sodium isethionate (2-hydroxyethanesulfonic acid, sodium salt), and 49 grams of trimellitic anhydride. Under a nitrogen sparge, the contents are heated to 149° C. at which temperature the mixture is liquid and uniform. The contents of the flask are slowly heated to 160° C. to 170° C. over a period of 25 to 35 minutes and thereupon 122 grams of diethylene glycol are added. The temperature is then slowly raised to 200° C. over a period of 45 to 120 minutes and the mixture allowed to polymerize for two to three hours subsequent to the addition of catalyst. Upon the approach of completion of polymerization as indicated by the quantity of distillate collected and by the increased viscosity and slightly hazy appearance of the material in the flask, the sparge tube is removed and the pressure is slowly reduced to less than 5 millimeters of mercury. The temperature is then raised to 220° C. After one hour under full vacuum of less than 5 millimeters of mercury, the mixture has changed from a rather fluid transparent liquid to a hazy viscous material. The vacuum is then relieved with nitrogen and the contents poured out onto a sheet of Teflon plastic. Upon cooling the polyester size obtained is tough and flexible. In order to produce a powdered material, the cooled polyester is chilled below 0° C. and crushed into a fine powder using a heavy-duty dough blender. When this powder is mixed with water and the mixture stirred to effect dispersion at a temperature of about 70° C. to about 100° C., the polymer appears to swell and then disperses to provide a hazy dispersion. It has been found that small quantities of sodium bicarbonate and/or a non-ionic surfactant accelerate the dispersion process so that the polymer will easily disperse in a period of 4 to 10 hours depending on the surface area of the finely powdered polyester.

An aqueous size solution was prepared having 18.4% size solids by dissolving the size prepared in Example 1 in a 1% soap and 1% soda ash aqueous solution heated to a temperature of 82° C. Using this solution, films were cast upon a polyethylene terephthalate surface, dried at 71° C. for 30 minutes and conditioned for 24 hours at 25° C. Laboratory evaluation indicated the size film had fair elongation, fair pliability and good adhesion to the polyethylene terephthalate but relatively poor film strength and excessive tackiness as compared to films similarly cast from a solution of a size of the prior art such as is disclosed in U.S. Pat. No. 3,546,008. Such a laboratory evaluation of the degree of tack of a size does not necessarily correlate with actual use performance but the other test results indicate the size of Example 1 would be useful as a textile size for a polyethylene terephthalate fiber.

EXAMPLES 2 AND 3

Following the procedure and proportions of Example 1, size compositions are prepared substituting in turn for the sodium isethionate, 2-hydroxy-1-propanesulfonic acid, sodium salt and 1-hydroxy-2-propanesulfonic acid, sodium salt. All other materials are the same as in Example 1. Polyesters useful as a textile fiber size are obtained.

EXAMPLES 4, 5 AND 6

The procedure of Example 1 is repeated using the same materials and proportions of materials except that for the diethylene glycol of Example 1 there is substituted in turn ethylene glycol, triethylene glycol and propylene glycol. Polyesters useful as a textile fiber size are obtained.

EXAMPLES 7 AND 8

A 10% aqueous solids dispersion of the size composition of the invention prepared in Example 1 is produced by heating to 70° C., while agitating, a mixture of water and the size of Example 1.

Five percent solids solutions are prepared of cornstarch and polyvinyl alcohol (98% hydrolyzed grade) by heating to 82° C. while under agitation a mixture of water and cornstarch or polyvinyl alcohol.

Equal parts of the size dispersion and either the cornstarch or the polyvinyl alcohol solutions are mixed to produce size compositions useful as textile fiber sizes.

The embodiments of the invention in which an exclusive property or privilege is claimed are defined as follows:

1. A branched water-dispersible polyester containing repeating carbonyl-oxy units wherein said units are an integral part of the polymer chain, said polyester comprising the reaction products of a diol or polyglycol, a polycarboxylic acid and an organic reactant containing an alkali metal salt of a sulfonic acid attached to an aromatic nucleus through an aliphatic or cycloaliphatic chain and ester linkage which is capable of rendering said polyester water-dispersible and which is present in the proportions of from about 5 mole percent to about 50 mole percent, based upon the sum of the theoretical mole percentages of the other carboxylic acid components of said polyester, wherein said organic reactant consists of the at least monofunctional reaction product of an aromatic polycarboxylic acid anhydride and an aliphatic or cycloaliphatic hydrocarbon hydroxysulfonic acid alkali metal salt.

2. A branched water-dispersible polyester which is the reaction product of
   (a) at least one polycarboxylic acid or polycarboxylic acid anhydride,
   (b) a diol or polyglycol or mixtures thereof consisting of a poly(ethylene glycol) having the formula:

H(OCH$_2$CH$_2$)$_n$OH or a poly(methylene glycol) having the formula:

HO(CH$_2$)$_n$OH wherein n is an integer of from 2 to about 10, and
   (c) at least one monofunctional reaction product of an aromatic carboxylic acid, having at least 2 carboxyl radicals or the anhydride or ester derivative thereof with an aliphatic or cycloaliphatic hydrocarbon hydroxysulfonic acid alkali metal salt wherein said alkali metal salt is attached to the nucleus of said aromatic carboxylic acid through an aliphatic or cycloaliphatic chain and ester linkage.

3. The polyester of claim 2 wherein said hydroxysulfonic acid has the formula:

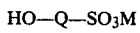

wherein Q is a bivalent hydrocarbon radical and M is an alkali metal ion.

4. The polyester of claim 3 wherein said metal ion is sodium and Q is aliphatic of about 2 to about 8 carbon atoms.

5. The polyester of claim 4 wherein said aromatic polycarboxylic acid or anhydride is selected from the group consisting of trimellitic acid or anhydride and pyromellitic acid or anhydride.

6. The polyester of claim 5 wherein said polycarboxylic acid (a) comprises a mixture of isophthalic acid and azelaic acid, said hydroxysulfonic acid metallic salt comprises a salt selected from the group consisting of 2-hydroxyethanesulfonic acid, sodium salt; 2-hydroxy-1-propanesulfonic acid sodium salt; and 1-hydroxy-2-propanesulfonic acid, sodium salt and said polyglycol comprises diethylene glycol.

7. The process of forming a branched water-dispersible polyester comprising polycondensing:
(a) at least one polycarboxylic acid, anhydride or ester derivative thereof;
(b) a diol or polyglycol; and
(c) the monomeric reaction product of an alkali metal salt of an hydroxysulfonic acid and an aromatic compound selected from the group consisting of a polycarboxylic acid, a polycarboxylic acid anhydride and a polycarboxylic acid ester and wherein said reaction product (c) is prepared by reacting less than a stoichiometric amount of said metal salt of an hydroxysulfonic acid with said aromatic compound.

8. The process of claim 7 wherein said carboxylic acid (a) is a mixture of azelaic acid and isophthalic acid, said polyglycol (b) is diethylene glycol, and said reaction product (c) of an hydroxysulfonic metal salt and an aromatic compound is the ester of sodium isethionate and trimellitic anhydride.

* * * * *